United States Patent
Ostlie

(10) Patent No.: US 7,111,428 B1
(45) Date of Patent: Sep. 26, 2006

(54) APPARATUS FOR HARMING OR KILLING FOULING FLORA OR FAUNA AND AN ITEM CARRYING THE SAME

(75) Inventor: Lars Steinar Ostlie, Warwickshire (GB)

(73) Assignee: Ocean Environmental Technologies Ltd., London (GB)

( * ) Notice: Subject to any disclaimer, the term of this patent is extended or adjusted under 35 U.S.C. 154(b) by 1826 days.

(21) Appl. No.: 08/708,961

(22) Filed: Sep. 6, 1996

(51) Int. Cl.
*A01M 19/00* (2006.01)

(52) U.S. Cl. .................................................. 43/124
(58) Field of Classification Search ............. 43/17.1, 43/98, 124; 114/222
See application file for complete search history.

(56) References Cited

U.S. PATENT DOCUMENTS

| | | | | |
|---|---|---|---|---|
| 855,588 A * | 6/1907 | Prudden | ......... | 43/98 |
| 2,818,672 A * | 1/1958 | Kreutzer | ........ | 43/17.1 |
| 3,241,512 A * | 3/1966 | Green | ........ | 114/222 |
| 3,524,276 A * | 8/1970 | Thomas | ........ | 43/17.1 |
| 3,625,852 A * | 12/1971 | Anderson | ........ | 114/222 |
| 4,283,461 A * | 8/1981 | Wooden | ........ | 114/222 |
| 4,767,512 A * | 8/1988 | Cowatch | ........ | 204/147 |
| 4,869,016 A * | 9/1989 | Diprose | ........ | 43/124 |
| 5,088,432 A * | 2/1992 | Usami | ........ | 114/222 |
| 5,152,637 A * | 10/1992 | Wayne | ........ | 43/98 |
| 5,346,598 A * | 9/1994 | Riffe | ........ | 204/147 |

\* cited by examiner

*Primary Examiner*—Kurt Rowan
(74) *Attorney, Agent, or Firm*—Wenderoth, Lind & Ponack, L.L.P.

(57) ABSTRACT

Apparatus for harming or killing fouling flora or fauna, for example on boat hulls, comprises two conductors and an AC power source. The first conductor is a conductive coating while the second conductor is a spaced sheet in one embodiment and a grid on a dielectric insulating coating in another embodiment.

60 Claims, 2 Drawing Sheets

APPARATUS FOR HARMING OR KILLING FOULING FLORA OR FAUNA AND AN ITEM CARRYING THE SAME

BACKGROUND OF THE INVENTION

The invention relates to apparatus for harming or killing fouling flora or fauna and an item carrying the same.

Fouling of items placed in the water, such as boat hulls, is a well known problem. The fouling problem is usually combated by the use of a toxic, anti-fouling paint which should kill animal or plant life which attaches itself to the painted surface. The use of toxins in this way is environmentally undesirable and other methods of control or elimination of fouling have been investigated. One such method is described in International patent application no. WO92/17061 in the name of the present applicant. The disclosure of that prior document is incorporated herein by reference. WO92/17061 discloses a trap for swimming larvae such as the larvae of fresh water mussels. The trap comprises two metal plates which are coated with insulating material and spaced apart in fresh water. The plates are connected to a high voltage AC generator to provide an electric field across the plates. Fresh water has low conductivity and so the leakage current between the plates is low. As the polarity of the water around a larvae changes, the induced polarity of the body liquid of the larvae also changes and this is sufficient to disable or kill the larvae relatively quickly. More than 90% of the internal content of a larvae is highly conductive aqueous liquid.

Providing two insulated conducting plates closely spaced apart so that larvae can swim between them may be relatively difficult to achieve.

BRIEF SUMMARY OF THE INVENTION

According to the first aspect of the invention there is provided apparatus for harming or killing fouling flora or fauna, the apparatus comprising two conductors and a dielectric member, the conductors being provided on either side of the dielectric member and an AC power source connected to the conductors.

In this way, the two conductors can simply be mounted on the dielectric member and close spacing need not be achieved. As the electric field generated by the two conductors will extend beyond the two conductors, this apparatus is effective in reducing or eliminating fouling.

Preferably, at least one of the conductors has a no more than semi-insulating coating. It had been believed that, in order to reduce leakage current and obtain the maximum polarization, the conductors should be insulated. Experiments with semi-insulated and uninsulated conductors, however gave improved effectiveness, surprisingly. Preferably, at least one of the conductors is bare.

According to another aspect of the invention, there is provided apparatus for harming or killing fouling flora or fauna, the apparatus comprising two conductors, each connected to an AC power source, one of the conductors being bare or having no more than a semi-insulating coating.

Preferably one of the conductors is bare. Preferably, the apparatus further includes a dielectric member and the conductors are provided on either side of the dielectric member.

In either case, one of the conductors may define apertures therein. The conductor may take any suitable form and in a preferred embodiment, one of the conductors comprises a grid. The apertures in the grid may be of any suitable size dependent on the power of the power source used and may typically be 3 to 6 mm where the apparatus is for use in fresh water or 50 to 100 mm where the apparatus is for use in sea water. The electric field provided by a structure of this kind is particularly effective. Material may be provided in the said apertures to reduce water resistance, for example, and also reduce the surface area of the apparatus. Insulating material may be provided in the said apertures and/or, non-toxic, anti-fouling paint may be provided in the apertures.

One of the conductors may conveniently comprise a conducting coating.

Where the conductors have a gap between them, the gap may be any suitable distance dependent on the power of the power source used and may be 3 to 6 mm where the apparatus is for use in fresh water or 50 to 100 mm where the apparatus is for use in sea water.

The power source may be arranged to apply a potential across the conductors of preferably at least 3 kV. The frequency of the power source is preferably at least 300 Hz. The AC power source preferably outputs a substantially square wave signal. In this way the transition from positive to negative potential is achieved quickly and so the induced polarization within a larva, for example, will also change quickly increasing the effectiveness of the apparatus. Preferably, the duration of the transition stage of the AC cycle is less than 500 micro seconds.

According to a further aspect of the invention there is provided an item to be placed in water, a part of the item which is to lie under water having a non-conducting surface or a non-conductive surface coating and the item including the apparatus of either aspect of the invention carried on the said part thereof.

The item may be any item which is placed in water and suitably may be a boat in which case the said part of the boat may be the hull of the boat.

The first conductor may conveniently comprise a coating applied to the said part of the item. In that case, an insulating coating is preferably provided on the first conductor. The insulating coating may constitute the aforesaid dielectric member where the same is provided. The second conductor may be provided on the insulating coating in that case.

BRIEF DESCRIPTION OF THE DRAWINGS

Two embodiments of the invention will now be described by way of example and with reference to the accompanying drawings, in which.

DETAILED DESCRIPTION OF THE PREFERRED INVENTION

Figure 1:
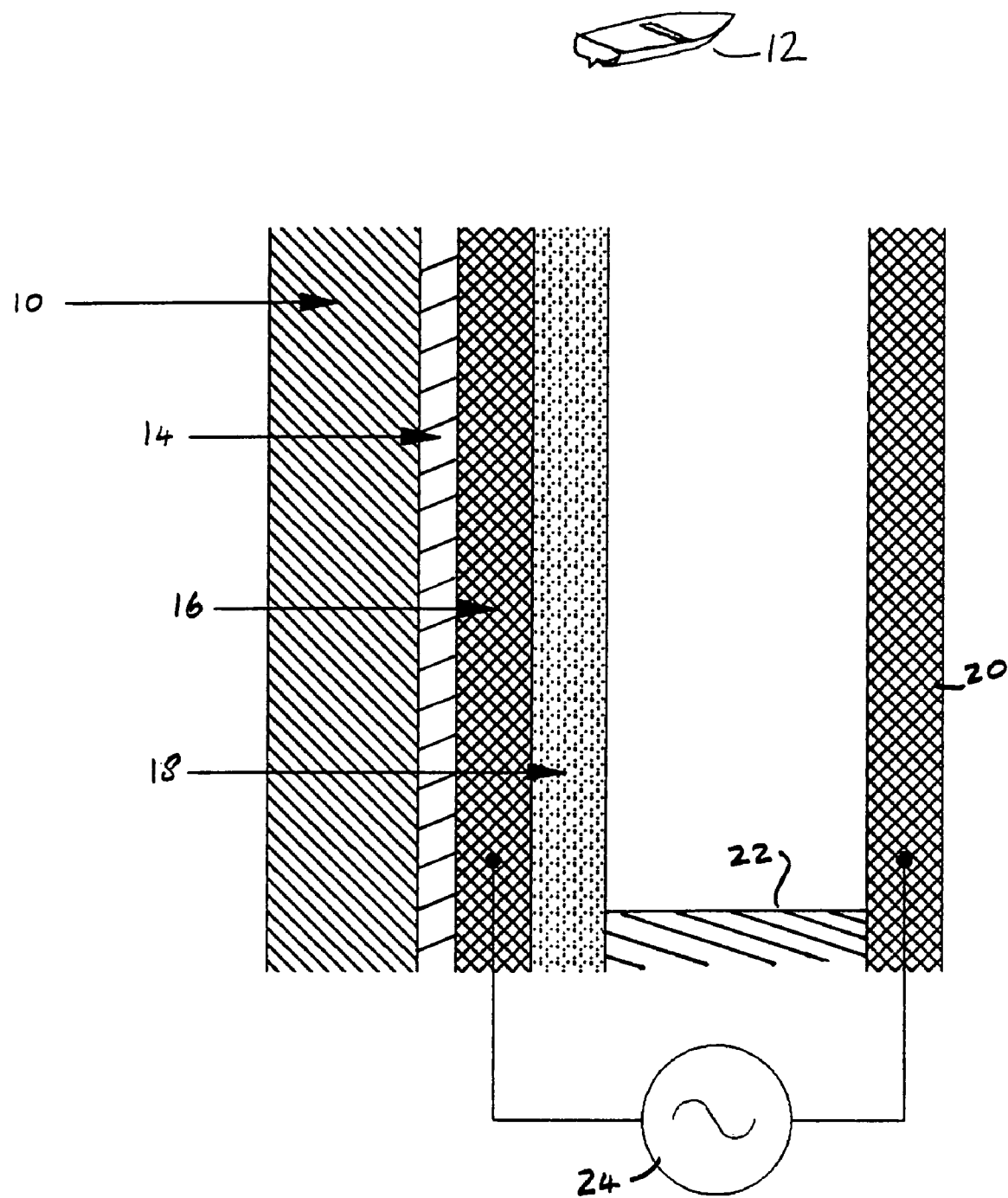
FIG. 1 a partially schematic detail cross-sectional view of the apparatus of the first embodiment of the invention; and, FIG. 2 a partially schematic detail cross-sectional view of the apparatus of the second embodiment.

FIG. 1 shows part of the hull 10 of a boat 12 which is shown in inset. An insulating coating 14 is applied to the hull 10 and a conductive coating 16 is applied to the insulating coating 14. A further insulating coating 18 incorporating anti-fouling paint is applied to the conductive coating 16. A bare electrode 20 is provided spaced from the surface of the outer insulating coating 18 by a distance of about 3 mm. A plurality of insulating spacers 22, one of which is shown in FIG. 1, mount the electrode 20. The electrode 20 and the conductive coating 16 constitute the aforesaid conductors and each is wired to an AC power source 24 which has a 300 Hz, 3 kV, square wave AC output.

In use, with the AC power source operating, the oscillations in the electric field produced between the conductive coating 16 and the electrode 20 will be sufficient to disable or kill Daphnia larvae in over 80% of cases and, with the use of a 4.8 Kv source, a success rate of 95%–100% was obtained.

Figure 2:
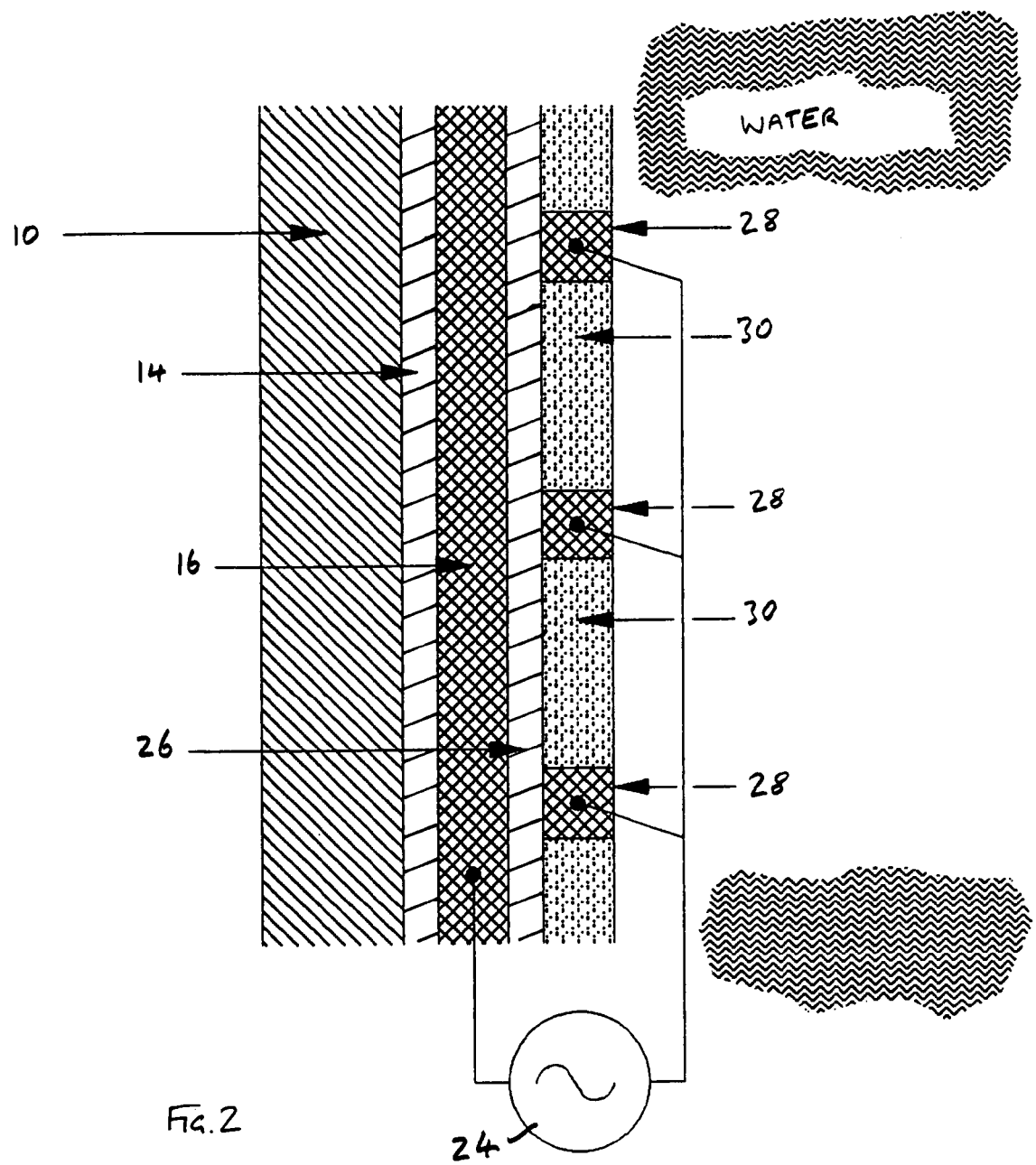

FIG. 2 shows the second embodiment which is similar to the first and the same reference numerals will be used for equivalent features.

Thus, an insulating coating 14 is supplied to the hull 10 of a boat 12. A conductive coating 16 is applied to the insulating coating 14, but a further insulating coating 26 is then applied to the conductive coating 16. A metal wire grid 28 is mounted on the second insulating coating 26. The grid apertures are about 6 mm square. The apertures between the wires of the grid 28 are filled with an insulating coating 30 which may include anti-fouling material. The insulating coating 30 does not cover the wires of the grid 28 which are bare to the water. The same AC power source 24 is used as before which in this case is connected to the conductive coating 16 and to the wire grid 28.

This embodiment is also extremely effective in killing and/or disabling Daphnia larvae which approach the grid 28.

The apparatus of either embodiment can be used either with or without normal toxic anti-fouling paint and where used not in conjunction with anti-fouling paint or in conjunction with non-toxic anti-fouling paint it provides a particularly environmentally friendly method of reducing or eliminating fouling and, as mentioned above, is extremely effective.

The apparatus of the first embodiment could be used in sea water with increased spacing between the conductive coating 16 and the electrode 20. Similarly the apparatus of the second embodiment could be used in sea water with increased grid aperture size.

Clearly the apparatus of either embodiment will be effective in harming or killing a wide variety of water life.

What is claimed is:

1. Apparatus for harming or killing fouling flora or fauna comprising:
    a solid dielectric member;
    a first conductor located on a first side of said solid dielectric member and in contact therewith, said first conductor having a surface to be mounted on a hull of a ship;
    a second conductor located on a second side of said solid dielectric member and in contact therewith; and
    an AC power source connected to said first and said second conductors.
2. Apparatus as claimed in claim 1, wherein at least one of said first and said second conductors has a coating that is no more than semi-insulating.
3. Apparatus as claimed in claim 1, wherein at least one of said first and said second conductors is bare.
4. Apparatus as claimed in claim 1, wherein at least one of said first and said second conductors has apertures therein.
5. Apparatus as claimed in claim 4, wherein said one conductor comprises a grid defining said apertures.
6. Apparatus as claimed in claim 5, wherein said apertures are sized 3 to 6 mm across.
7. Apparatus as claimed in claim 5, wherein said apertures are sized 50 to 100 mm across.
8. Apparatus as claimed in claim 4, wherein a material, which is less conductive than said first and said second conductors, is provided in said apertures.
9. Apparatus as claimed in claim 1, wherein said first and said second conductors are spaced 3 to 6 mm apart.
10. Apparatus as claimed in claim 1, wherein said first and said second conductors are spaced 50 to 100 mm apart.
11. Apparatus as claimed in claim 1, wherein said AC power source applies a potential across said first and said second conductors of at least 3 kV.
12. Apparatus as claimed in claim 1, wherein said AC power source operates at a frequency of at least 300 Hz.
13. Apparatus as claimed in claim 1, wherein said AC power source generates a substantially square wave signal.
14. Apparatus as claimed in claim 13, wherein said AC power source has a transition stage duration of less than 500 micro seconds.
15. Apparatus for harming or killing fouling flora or fauna comprising:
    a first conductor;
    a second conductor; and
    an AC power source connected to said first and said second conductors;
    wherein one of said first and said second conductors is bare or has no more than a semi-insulating coating, and the other of said first and said second conductors has on a side thereof to be directed toward water during use an insulating coating to insulate said other electrode from the water during use.
16. Apparatus as claimed in claim 15, wherein said one conductor is bare.
17. Apparatus as claimed in claim 15, further comprising a dielectric member provided between said first and said second conductors in contact therewith.
18. Apparatus as claimed in claim 15, wherein at least one of said first and said second conductors has apertures therein.
19. Apparatus as claimed in claim 18, wherein said one conductor comprises a grid defining said apertures.
20. Apparatus as claimed in claim 19, wherein said apertures are sized 3 to 6 mm across.
21. Apparatus as claimed in claim 19, wherein said apertures are sized 50 to 100 mm across.
22. Apparatus as claimed in claim 18, wherein a material, which is less conductive than said first and said second conductors, is provided in said apertures.
23. Apparatus as claimed in claim 15, wherein said first and said second conductors are spaced 3 to 6 mm apart.
24. Apparatus as claimed in claim 15, wherein said first and said second conductors are spaced 50 to 100 mm apart.
25. Apparatus as claimed in claim 15, wherein said AC power source applies a potential across said first and said second conductors of at least 3 kV.
26. Apparatus as claimed in claim 15, wherein said AC power source operates at a frequency of at least 300 Hz.
27. Apparatus as claimed in claim 15, wherein said AC power source generates a substantially square wave signal.
28. Apparatus as claimed in claim 27, wherein said AC power source has transition stage duration of less than 500 micro seconds.
29. An item to be placed in water comprising:
    a portion to be placed under water having a non-conducting surface or a non-conductive surface coating;
    first and second conductors located on said portion to be placed under water;
    a solid dielectric member located between and in contact with said first and said second conductors; and
    an AC power source connected to said first and said second conductors.

30. An item as claimed in claim 29, wherein said item is a boat and said portion to be placed under water is a hull of said boat.

31. An item as claimed in claim 29, wherein at least one of said first and said second conductors has a coating that is no more than semi-insulating.

32. An item as claimed in claim 29, wherein at least one of said first and said second conductors is bare.

33. An item as claimed in claim 29, wherein at least one of said first and said second conductors has apertures therein.

34. An item as claimed in claim 33, wherein said one conductor comprises a grid defining said apertures.

35. An item as claimed in claim 34, wherein said apertures are sized 3 to 6 mm across.

36. An item as claimed in claim 34, wherein said apertures are sized 50 to 100 mm across.

37. An item as claimed in claim 33, wherein a material, which is less conductive than said first and said second conductors, is provided in said apertures.

38. An item as claimed in claim 29, wherein said first and said second conductors are spaced 3 to 6 mm apart.

39. An item as claimed in claim 29, wherein said first and said second conductors are spaced 50 to 100 mm apart.

40. An item as claimed in claim 29, wherein said AC power source applies a potential across said first and said second conductors of at least 3 kV.

41. An item as claimed in claim 29, wherein said AC power source operates at a frequency of at least 300 Hz.

42. An item as claimed in claim 29, wherein said AC power source generates a substantially square wave signal.

43. An item as claimed in claim 42, wherein said AC power source has transition stage duration of less than 500 micro seconds.

44. An item to be placed in water comprising:
   a portion to be placed under water having a non-conducting surface or a non-conductive surface coating;
   first and second conductors located on said portion to be placed under water; and
   an AC power source connected to said first and said second conductors;
   wherein one of said first and said second conductors is bare or has no more than a semi-insulating coating, and the other of said first and said second conductors has on a side thereof to be directed toward the water during use an insulating coating to insulate said other electrode from the water during use.

45. An item as claimed in claim 44, wherein said item is a boat and said portion to be placed under water is a hull of said boat.

46. An item as claimed in claim 44, wherein at least one of said first and said second conductors is bare.

47. An item as claimed in claim 44, further comprising a dielectric member provided between said first and said second conductors in contact therewith.

48. An item as claimed in claim 44, wherein at least one of said first and said second conductors has apertures therein.

49. An item as claimed in claim 48, wherein said one conductor comprises a grid defining said apertures.

50. An item as claimed in claim 49, wherein said apertures are sized 3 to 6 mm across.

51. An item as claimed in claim 48, wherein said apertures are sized 50 to 100 mm across.

52. An item as claimed in claim 48, wherein a material, which is less conductive than said first and said second conductors, is provided in said apertures.

53. An item as claimed in claim 44, wherein said first and said second conductors are spaced 3 to 6 mm apart.

54. An item as claimed in claim 44, wherein said first and said second conductors are spaced 50 to 100 mm apart.

55. An item as claimed in claim 44, wherein said AC power source applies a potential across said first and said second conductors of at least 3 kV.

56. An item as claimed in claim 44, wherein said AC power source operates at a frequency of at least 300 Hz.

57. An item as claimed in claim 44, wherein said AC power source generates a substantially square wave signal.

58. An item as claimed in claim 57, wherein said AC power source has transition stage duration of less than 500 micro seconds.

59. An apparatus as claimed in claim 1, wherein one of said first and second conductors is insulated from surrounding water during use.

60. An item as claimed in claim 29, wherein one of said first and second conductors is insulated from surrounding water during use.

* * * * *